United States Patent
Lee

(10) Patent No.: US 8,094,173 B2
(45) Date of Patent: Jan. 10, 2012

(54) METHOD AND SYSTEM FOR ADJUSTING SCREEN RESOLUTION

(75) Inventor: Kuan-Hsueh Lee, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 607 days.

(21) Appl. No.: 12/274,341

(22) Filed: Nov. 19, 2008

(65) Prior Publication Data
US 2009/0315922 A1 Dec. 24, 2009

(30) Foreign Application Priority Data
Jun. 19, 2008 (CN) .......................... 2008 1 0302210

(51) Int. Cl.
*G09G 5/02* (2006.01)
(52) U.S. Cl. ..................................................... 345/698
(58) Field of Classification Search .................... 345/698
See application file for complete search history.

(56) References Cited

U.S. PATENT DOCUMENTS
2007/0063994 A1* 3/2007 Carlson et al. ................ 345/179

FOREIGN PATENT DOCUMENTS
CN 1886722 A 12/2006

OTHER PUBLICATIONS

Barnett, SnapperMail review, 2007 archived, Website: Handheld computing, Location: http://web.archive.org/web/20070608010317/http://www.hhcmag.com/reviews/snappermail/index.htm.*

* cited by examiner

*Primary Examiner* — Quan-Zhen Wang
*Assistant Examiner* — Nelson D Runkle, III
(74) *Attorney, Agent, or Firm* — Altis Law Group, Inc.

(57) ABSTRACT

A method and system for adjusting a screen resolution of a liquid crystal display module (LCM) of a portable electronic device are provided. The portable electronic device includes a touch panel, and a bay configured to receive and hold a stylus. The method includes receiving input signals received from the touch panel corresponding to user inputs, detecting usage statuses of the user inputs and generating a status notification indicative of the usage statuses of the user inputs; and adjusting the screen resolution of the LCM according to a determined current resolution mode of the LCM and a determined incompatibility of the resolution mode.

7 Claims, 2 Drawing Sheets

METHOD AND SYSTEM FOR ADJUSTING SCREEN RESOLUTION

BACKGROUND

1. Field of the Invention

Embodiments of the present disclosure relate to resolution adjustment, and more particularly to a method and a system for adjusting screen resolution.

2. Description of Related Art

Currently, many electronic devices provide one or more input methods to input commands to the electronic devices. As an example, a related portable electronic device includes a liquid crystal display module (LCM) for displaying user interfaces and a touch panel arranged beneath the LCM for detecting and locating contacts made, by a stylus or a user's fingers, for providing menu selections to access data or activating functions.

Because the stylus is capable of precise inputs, the LCM is configured for displaying small icons on the user interfaces. However, such small icons are inconvenient for performing the user inputs by the user's fingers.

Accordingly, a method and a system for adjusting the screen resolution are called for in order to overcome the limitations described.

DETAILED DESCRIPTION OF CERTAIN INVENTIVE EMBODIMENTS

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
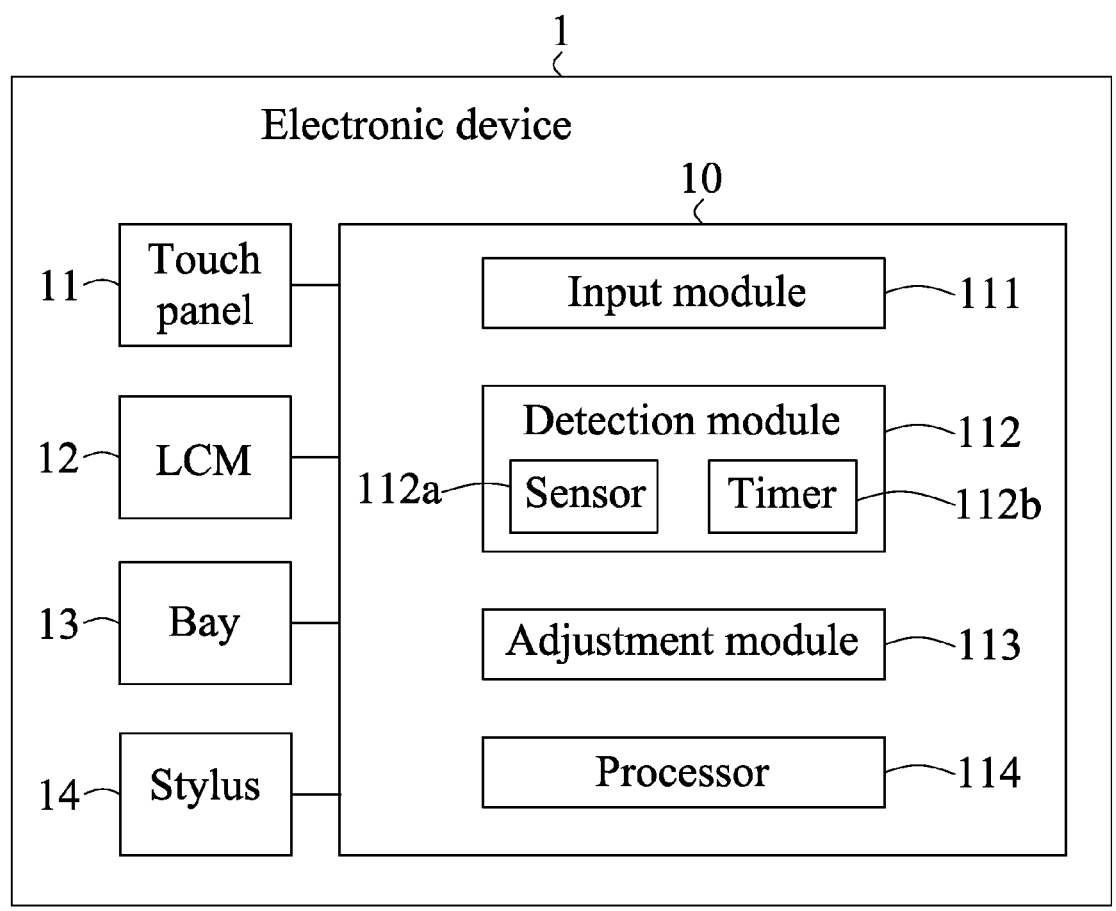
FIG. 1 is a block diagram of an embodiment of a system for adjusting screen resolution.
Figure 2:
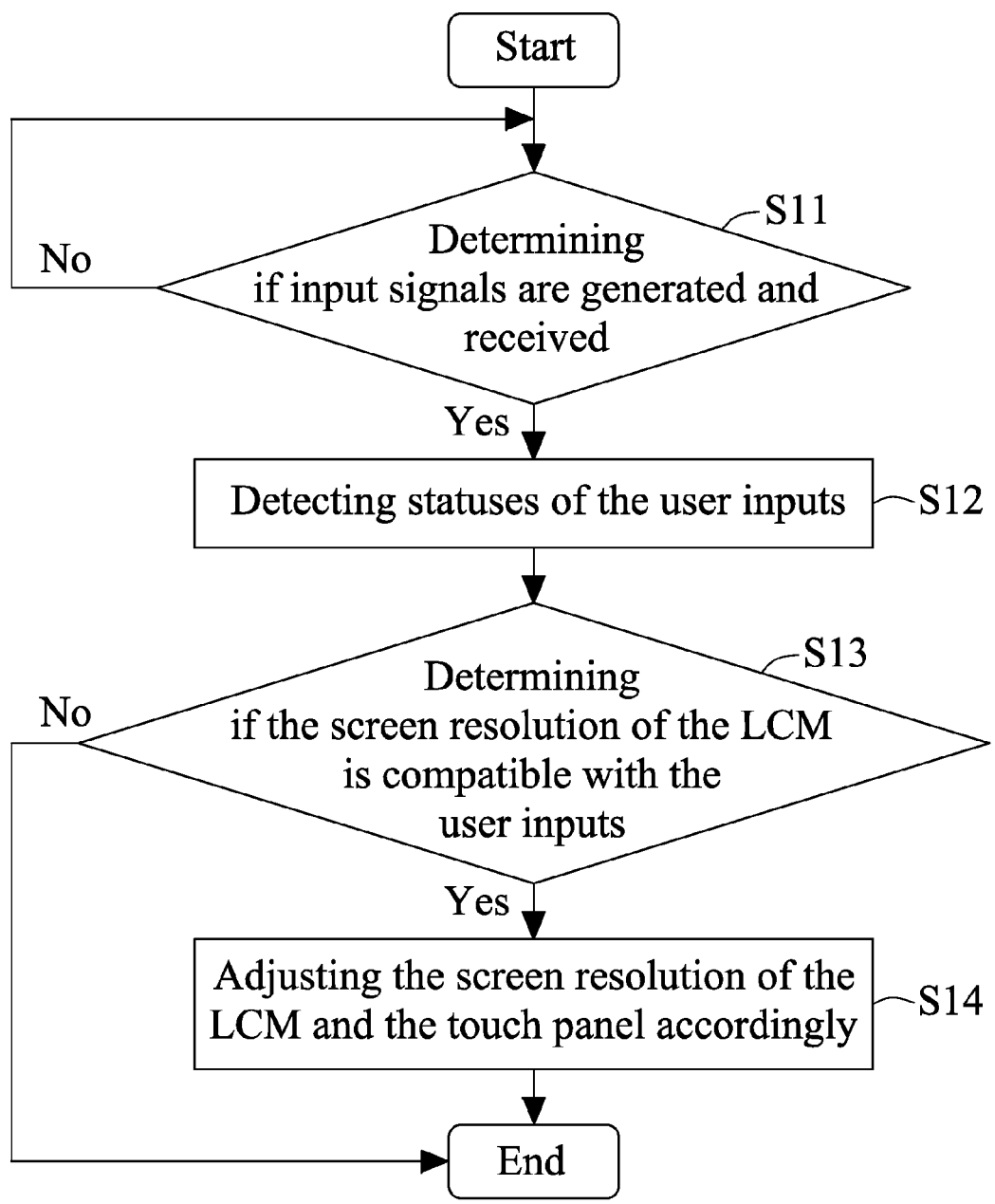
FIG. 2 is a flowchart of an embodiment of a method for adjusting the screen resolution.

FIG. 1 is a block diagram of an embodiment of a system 10 for adjusting screen resolution (hereinafter "the system 10") of a liquid crystal display module (LCM) 12 of an electronic device 1. The electronic device 1, such as a mobile phone, includes, in addition to the LCM 12, a touch panel 11, a bay 13, a stylus 14, and the system 10. Portable and non-portable electronic devices other than the mobile phone shown here, such as notebook computers and personal digital assistants (PDAs), for example, may equally utilize the system 10, without departing from the spirit of the disclosure.

The touch panel 11 is electronically coupled with the LCM 12 and includes a sensing unit for detecting and locating contact points made with the LCM 12. When a specific point is contacted, location of the contact point is transmitted to the sensing unit. The touch panel 11 then detects coordinates of the contacted points of user inputs according to a coordination system. In the embodiment, the user inputs include one or more contacts with the stylus 14 contacting with the touch panel 11 or one or more contacts made by a user's fingers contacting with the touch panel 11, but the disclosure is not limited thereto. The bay 13 is integrally configured on the electronic device 1 for receiving and holding the stylus 14 for performing the user inputs.

The LCM 12 is for displaying user interfaces of applications executed on the electronic device 1. In the embodiment, the LCM 12 includes two resolution modes, such as a "high resolution mode" and a "low resolution mode," but the disclosure is not limited thereto. For example, when operating in the "high resolution mode," the LCM 12 is capable of displaying image data of 240×320 pixels. In addition, when operating in the "low resolution mode," the LCM 12 is capable of displaying image data of 176×220 pixels.

It is to be noted that when operating in the "low resolution mode," the user interfaces of the application are displayed by large icons. For example, the large icons are at the size of 26×26 pixels. Under the circumstances, the user inputs may be made by the fingers of a user. In addition, when operating in the "high resolution mode," the user interfaces of the applications are displayed by small icons. For example, the large icons are at the size of 16×16 pixels. In this way, the user inputs may be the stylus 14 so as to prevent erroneous inputs.

In an embodiment, the system 10 includes an input module 111, a detection module 112, an adjustment module 113, and a processor 114 for executing the above modules, in addition to other hardware and software components of the system 10.

The input module 111 is configured for receiving the input signals generated by the user inputs from the touch panel 11 and then transmitting the input signals to the detection module 112.

The detection module 112 includes a sensor 112a for detecting usage statuses of the user inputs, such as determining if the stylus 14 has been received in the bay 13 upon receiving the input signals. The detection module 112 is also configured for continuously detecting whether the stylus 14 has not been received in the bay 13 after receiving the input signals for a predetermined interval. The predetermined interval is counted by a timer 112b of the detection module 112.

In the embodiment, the interval has a default value. For example, if the default value of the interval is 5 seconds, the detection module 114 detects whether the stylus 14 has not been received in the bay 13 every 5 seconds. It is to be noted that the value of the interval may be modified according to actual requirements.

The detection module 112 is also configured for generating a status notification indicating the usage statuses of the user inputs. For example, the status notification indicates whether the stylus 14 has been received in the bay 13.

The detection module 112 is configured for adjusting the screen resolution of the LCM 12 and the touch panel 11 upon determining the resolution mode of the LCM 12 is incompatible with the user inputs.

Upon receiving the status notification from the detection module 112, the detection module 112 determines the user input based on the status notification received from the detection module 112. In the embodiment, the user input is determined to be the stylus 14 if the status notification indicates that the stylus 14 has not been received in the bay 13. Otherwise, the user input is determined to be the fingers of the user.

Further, the adjustment module 113 detects the resolution mode of the LCM 12 so as to determine whether the resolution mode of the LCM 12 is compatible with the user inputs. Upon detecting the LCM 12 operates in "high resolution mode" and determining that the user input relates to the fingers of a user, the adjustment module 113 reduces the screen resolution of the LCM 12 such that the user interfaces are displayed by large icons.

In addition, upon detecting the LCM 12 operates in "low resolution mode" and the user input relates to the stylus 14, the adjustment module 113 improves the screen resolution of the LCM 12 such that the user interfaces are displayed by small icons.

FIG. 4 is a flowchart of an embodiment of a method for adjusting screen resolution. The method of FIG. 4 may used for automatically adjusting the screen resolution of the LCM 12 according to usage statuses of the user inputs. Depending on the embodiment, additional blocks may be added or deleted and the blocks may be executed in order other than that described.

In block S11, the input module 111 determines if input signals are being generated and received. The input signals are generated by the user inputs, such as a user's fingers or the stylus 14, by contacting the touch panel 11. If no input signals are being generated, the input module 111 continuously determines whether the user inputs are making contact with the touch panel 11.

In block S12, the detection module 112 detects usage statuses of the user inputs. For example, the detection module 112 detects if the stylus 14 has been received in the bay 13. The detection module 112 also generates a status notification indicating whether the stylus 14 has been received in the bay 13 accordingly, and transmits the status notification to the adjustment module 113.

In block S13, the adjustment module 113 determines if the current screen resolution of the LCM 12 is compatible with the current user inputs. For example, if the status notification indicates that the stylus 14 has been received in the bay, the user input is determined to be fingers of the user. In this case, if the LCM 12 operates in the "high resolution mode," the adjustment module 113 determines that the screen resolution of the LCM 12 is incompatible with the user inputs.

In block S14, the adjustment module 113 adjusts the screen resolution of the LCM 12 and adjusts the touch panel 11 accordingly. For the above-mentioned example, the adjustment module 113 reduces the screen resolution of the LCM 12 so that the user interfaces are displayed by large icons on the LCM 12.

It is important to note that while the disclosure has been described in the context of a fully functioning data processing system, those of ordinary skill in the art will appreciate that the processes of the disclosure are capable of being distributed in the form of a computer readable medium of instructions and a variety of forms and that the disclosure applies equally regardless of the particular type of signal bearing media actually used to carry out the distribution. Examples of computer readable media include recordable-type media such as floppy disc, a hard disk drive, random access memory (RAM), and compact disc-read only memory (CD-ROM), as well as transmission-type media, such as digital and analog communications links.

It should be emphasized that the described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. A computing system for adjusting a screen resolution of a liquid crystal display module (LCM) of a portable electronic device, the portable electronic device comprising a touch panel, and a bay configured to receive and hold a stylus, the system comprising:
    an input module configured for receiving input signals received from the touch panel, wherein the input signals correspond to user inputs contacting the touch panel to activate one or more functions of the portable electronic device;
    a detection module configured for detecting usage statuses of the user inputs and for generating a status notification indicative of the usage statuses of the user inputs, wherein the status notification indicates that the user input is by finger touch if the stylus is not received in the bay and the status notification indicates that the user input is by the stylus if the stylus is received in the bay;
    an adjustment module configured for receiving the status notification from the detection module, and detecting a resolution mode of the LCM to determine whether the resolution mode of the LCM is compatible with the user inputs, wherein the resolution mode comprises a high resolution mode and a low resolution mode; and
    the adjustment module further configured for reducing the screen resolution of the LCM upon the condition that the LCM is in the high resolution mode and the user input is by the finger touch, so that user interfaces of the portable electronic device are displayed using large icons, or increasing the screen resolution of the LCM upon the condition that the LCM is in the low resolution mode and the user input is by the stylus, so that the user interfaces are displayed using small icons.

2. The system as claimed in claim 1, wherein the detection module is further configured for continuously detecting the usage statuses of the user input for a predetermined interval after receiving the input signals and generating the status notification accordingly.

3. The system as claimed in claim 2, wherein the detection module comprises a timer for counting the predetermined interval and a sensor for determining if the stylus has been received in the bay.

4. The system as claimed in claim 1, wherein the bay is integrally configured on the portable electronic device to receive and hold the stylus.

5. A computer-implemented method for adjusting a screen resolution of a liquid crystal display module (LCM) of a portable electronic device, the portable electronic device comprising a touch panel, and a bay configured to receive and hold a stylus, the method comprising:
    receiving input signals received from the touch panel, wherein the input signals correspond to user inputs contacting the touch panel to activate one or more functions of the portable electronic device;
    detecting usage statuses of the user inputs and generating a status notification indicative of the usage statuses of the user inputs, wherein the status notification indicates that the user input is by finger touch if the stylus is not received in the bay and the status notification indicates that the user input is by the stylus if the stylus is received in the bay;
    receiving the status notification, and detecting a resolution mode of the LCM to determine whether the resolution mode of the LCM is compatible with the user inputs, wherein the resolution mode comprises a high resolution mode and a low resolution mode; and
    reducing the screen resolution of the LCM upon the condition that the LCM is in the high resolution mode and the user input is by the finger touch, so that user interfaces of the portable electronic device are displayed using large icons, or increasing the screen resolution of the LCM upon the condition that the LCM is in the low resolution mode and the user input is by the stylus, so that the user interfaces are displayed using small icons.

6. The computer-implemented method as claimed in claim 5, wherein the method further comprises:
   continuously detecting the usage statuses of the user input for a predetermined interval after receiving the input signals; and
   generating the status notification accordingly.

7. A non-transitory computer-readable medium having stored thereon instructions that, when executed by a processor of a portable electronic device, causes the portable electronic device to perform a method for adjusting a screen resolution of a liquid crystal display module (LCM) of the portable electronic device, the method comprising:
   receiving input signals received from a touch panel of the portable electronic device, wherein the input signals correspond to user inputs contacting the touch panel to activate one or more functions of the portable electronic device;
   detecting usage statuses of the user inputs and generating a status notification indicative of the usage statuses of the user inputs, wherein the status notification indicates that the user input is by finger touch if the stylus is not received in the bay and the status notification indicates that the user input is by the stylus if the stylus is received in the bay; and
   receiving the status notification, and detecting a resolution mode of the LCM to determine whether the resolution mode of the LCM is compatible with the user inputs, wherein the resolution mode comprises a high resolution mode and a low resolution mode; and
   reducing the screen resolution of the LCM upon the condition that the LCM is in the high resolution mode and the user input is by the finger touch, so that user interfaces of the portable electronic device are displayed using large icons, or increasing the screen resolution of the LCM upon the condition that the LCM is in the low resolution mode and the user input is by the stylus, so that the user interfaces are displayed using small icons.

* * * * *